(12) United States Patent
Hamaguchi et al.

(10) Patent No.: US 7,247,826 B2
(45) Date of Patent: Jul. 24, 2007

(54) OPTICAL PICKUP APPARATUS

(75) Inventors: Shinichi Hamaguchi, Hyogo (JP); Naoki Nakanishi, Shiga (JP); Tatsuya Nakamori, Kyoto (JP); Naoto Shimada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/384,291

(22) Filed: Mar. 21, 2006

(65) Prior Publication Data

US 2006/0237624 A1 Oct. 26, 2006

(30) Foreign Application Priority Data

Apr. 25, 2005 (JP) .............................. 2005-125823

(51) Int. Cl.
G02B 7/04 (2006.01)
G02B 27/40 (2006.01)
G02B 27/64 (2006.01)

(52) U.S. Cl. ................................ 250/201.5; 369/112.1; 359/558; 359/571

(58) Field of Classification Search ............ 250/201.5; 349/201, 202; 359/15, 32, 25, 558, 563, 359/566, 569, 571, 572, 574, 576, 629; 369/110.03, 369/112.03–112.16

See application file for complete search history.

(56) References Cited

U.S. PATENT DOCUMENTS 6,891,675 B2 * 5/2005 Ohyama ..................... 359/566

2004/0213135 A1 * 10/2004 Mori et al. ............. 369/112.15
2005/0018561 A1 * 1/2005 Miyake ................... 369/44.41

FOREIGN PATENT DOCUMENTS

JP 2001176119 A 6/2001

\* cited by examiner

Primary Examiner—Georgia Epps
Assistant Examiner—Francis M. LeGasse, Jr.
(74) Attorney, Agent, or Firm—Steptoe & Johnson LLP

(57) ABSTRACT

An optical path coupling member aligns an optical axis directed to a light condensing member of the first wavelength light having a shortest wavelength with that of the third wavelength light having a longest wavelength. A diffraction element condenses +2nd order diffracted light of the first wavelength light and +1st order diffracted light of the second wavelength light and third wavelength light into a first photodetector, the −2nd order diffracted light of the first wavelength light and −1st order diffracted light of the third wavelength light into a second photodetector, and −1st order diffracted light of the remaining second wavelength light into a photodetector, using ±2nd order diffracted light of the first wavelength light and ±1st order diffracted light of the second wavelength light and third wavelength light as signal light from an optical information recording medium. Consequently, the overall size of the optical pickup apparatus is reduced.

4 Claims, 5 Drawing Sheets

GRATING SHAPE

GRATING SHAPE

OPTICAL PICKUP APPARATUS

FIELD OF THE INVENTION

The present invention relates to an optical pickup apparatus which records, reproduces or erases information to/from an optical information recording medium such as an optical medium, for example, optical disk, optical card or magneto-optical medium.

BACKGROUND OF THE INVENTION

An optical memory technology using an optical information recording medium having a pit-shaped pattern as a high-density/large-capacity recording medium is expanding its application range, for example, digital audio disk, video disk, document file disk and, what is more, data file. According to the optical memory technology, information is recorded, reproduced or erased to/from an optical information recording medium using micro condensed light beams with high accuracy and reliability. This recording/reproducing operation or the like depends on an optical system.

Basic functions of the optical pickup apparatus which is principally composed of an optical system can be roughly divided into light condensing that forms micro spots of diffraction limits, focus control and tracking control of the optical system and detection of pit signals. These functions are realized by combinations of various types of optical systems and photoelectrical conversion/detection systems according to their purposes and applications. In recent years, a diffraction element (hologram) is used to reduce the size and thickness of the optical pickup apparatus (e.g., see Japanese Patent Laid-Open No. 2001-176119).

This type of optical pickup apparatus is shown in FIG. 5. Patent Document 1 describes a case where two wavelengths are used, but an apparatus using three wavelengths will be shown here and operations thereof will be explained.

A light source 101A is a light source which emits light having a first wavelength and a light source 101B is a light source which emits light having a second wavelength which is longer than the first wavelength and light having a third wavelength which is longer than the second wavelength.

Light emitted from the light source 101A is reflected by an optical path coupling member 104, condensed by a light condensing member 105, irradiated onto an optical information recording medium 106 and reflected light reflected by the optical information recording medium 106 is condensed by the light condensing member 105, passes through the optical path coupling member 104, enters a diffraction element 103 where it is diffracted so as to selectively enter predetermined photodetectors 102 (102A to 102D).

Light emitted from the light source 101B is condensed by the light condensing member 105, irradiated onto the optical information recording medium 106, reflected light reflected by the optical information recording medium 106 is condensed by the light condensing member 105, enters the diffraction element 103 where it is diffracted so as to selectively enter the predetermined photodetectors 102 (102A to 102D).

That is, if the light diffracted toward the right in the figure by the diffraction element 103 is defined as − (minus) and the light diffracted toward the left is defined as + (plus), of the diffracted light of the first to third wavelengths, +1st order diffracted light is input to the same photodetector 102A, and with regard to −1st order diffracted light, diffracted light of the first wavelength light enters the photodetector 102B and diffracted light of the second wavelength light enters the photodetector 102C and diffracted light of the third wavelength light enters the photodetector 102D. An electric signal is then output according to the amount of light received from the photodetectors 102A to 102D.

DISCLOSURE OF THE INVENTION

As described above, in the optical pickup apparatus which obtains a signal of an optical information recording medium by means of the +1st order diffracted light and −1st order diffracted light, one photodetector can be commonly used for the +1st order diffracted light, but for the −1st order diffracted light, dedicated photodetectors need to be provided according to the wavelengths of light emitted from the light sources. That is, when the first to third wavelength light is used, at least four photodetectors, that is, photodetectors 102A, 102B, 102C, 102D are required.

When an attempt is made to form photodetectors on one light-receiving element, the size of the light-receiving element increases as the number of necessary photodetectors increases. There are light-receiving elements furnished with a calculation unit (e.g., integrated circuit) which calculates a signal from a photodetector, but when the number of photodetectors increases, the calculation unit must be located at a position different from a conventional position and in such a case, the size of the light-receiving element generally further increases. In this way, when the part size of the light-receiving element increases, the overall size of the optical pickup apparatus increases.

The present invention has been implemented in view of the above described problems and it is an object of the present invention to reduce the size of an optical pickup apparatus using three wavelengths.

In order to attain the above described object, the optical pickup apparatus of the present invention is an optical pickup apparatus including light sources for emitting light rays having first, second, third wavelengths, an optical path coupling member for bringing the light rays having the first to third wavelengths to be in a common traveling direction, a light condensing member for condensing light from the optical path coupling member on an optical information recording medium, a diffraction element for diffracting reflected light from the optical information recording medium, and a plurality of photodetectors for receiving diffracted light rays from the diffraction element, wherein the optical path coupling member aligns an optical axis directed to the light condensing member of the first wavelength light having a shortest wavelength with that of the third wavelength light having a longest wavelength, and the diffraction element condenses +2nd order diffracted light of the first wavelength light and +1st order diffracted light of the second wavelength light and third wavelength light into a first photodetector, and −2nd order diffracted light of the first wavelength light and −1st order diffracted light of the third wavelength light into a second photodetector, by way of using ±2nd order diffracted light of the first wavelength light and ±1st order diffracted light of the second wavelength light and third wavelength light as signal light from the optical information recording medium.

It is preferable from the standpoint of an installation space to unite the light source for emitting the second wavelength light and third wavelength light and the photodetectors. The diffraction element having a sawtooth or square wave shaped cross section can be preferably used. The first wavelength may be 405 nm, second wavelength may be 650 nm, and third wavelength may be 780 nm.

DESCRIPTION OF THE EMBODIMENTS

Figure 1:
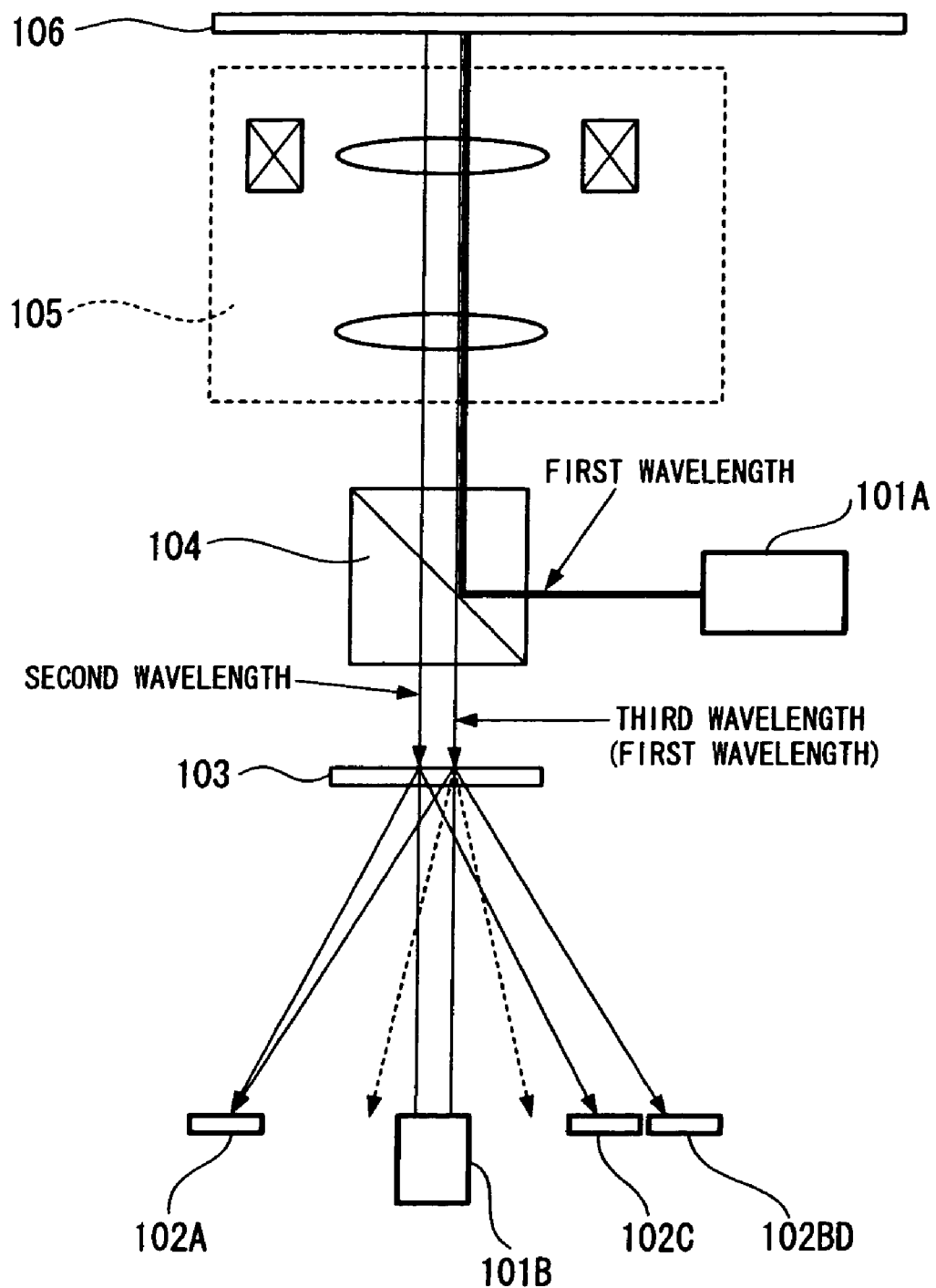
FIG. 1 shows a schematic construction of an optical pickup apparatus of the present invention.

In the optical pickup apparatus shown in FIG. 1, a light source 101A is a light source which emits light having a first wavelength and a light source 101B is a light source which emits light having a second wavelength which is longer than the first wavelength and light having a third wavelength which is longer than the second wavelength. The first wavelength is 405 nm used, for example, for BD (Blu-ray Disc) or HD-DVD (High Definition Digital Versatile Disc), the second wavelength is 650 nm used, for example, for DVD and the third wavelength is 780 nm used, for example, for CD (Compact Disc). A semiconductor laser is used for these light sources 101A and 101B.

A diffraction element 103, optical path coupling member 104 and light condensing member 105 are disposed in that order from the light source 101B side between the light source 101B and an optical information recording medium 106. The light source 101A is disposed so as to directly emit light to the optical path coupling member 104. A plurality of photodetectors 102 (102A, 102C, 102BD) which output electric signals according to the amount of light received are disposed on one side of the diffraction element 103, behind which the optical path coupling member 104 is disposed.

A photo-detection diode formed on a semiconductor (Si) substrate is used as the photodetector 102, a hologram element is used as the diffraction element 103, a polarization beam splitter is used as the optical coupling member 104 and an actuator provided with a collimator lens and objective lens is used as the light condensing member 105, but the present invention is not limited to them.

With this arrangement, light emitted from the light source 101A is reflected by the optical path coupling member 104, condensed by the light condensing member 105, irradiated onto the optical information recording medium 106 and reflected light reflected by the optical information recording medium 106 is condensed by the light condensing member 105, passes through the optical path coupling member 104, enters the diffraction element 103, where it is diffracted so as to selectively enter any one of the photodetectors 102.

On the other hand, light emitted from the light source 101B passes through the diffraction element 103 and optical path coupling member 104, is condensed by the light condensing member 105, irradiated onto the optical information recording medium 106 and reflected light reflected by the optical information recording medium 106 is condensed by the light condensing member 105, passes through the optical path coupling member 104, enters the diffraction element 103, where it is diffracted so as to selectively enter any one of the photodetectors 102.

What this optical pickup apparatus differs from the conventional one explained above using FIG. 5 is that the optical path coupling member 104 substantially aligns the optical axis of the first wavelength light with that of the third wavelength light.

Furthermore, another difference is that when light diffracted toward the right in the figure by the diffraction element 103 is defined as − (minus) and light diffracted toward the left is defined as + (plus), the photodetectors 102 are arranged so that +2nd order diffracted light of the first wavelength light and +1st order diffracted light of the second wavelength light and third wavelength light enter the photodetector 102A, −2nd order diffracted light of the first wavelength light and −1st order diffracted light of the third wavelength light enter the photodetector 102BD and −1st order diffracted light of the second wavelength light enters the photodetector 102C.

Figure 5:
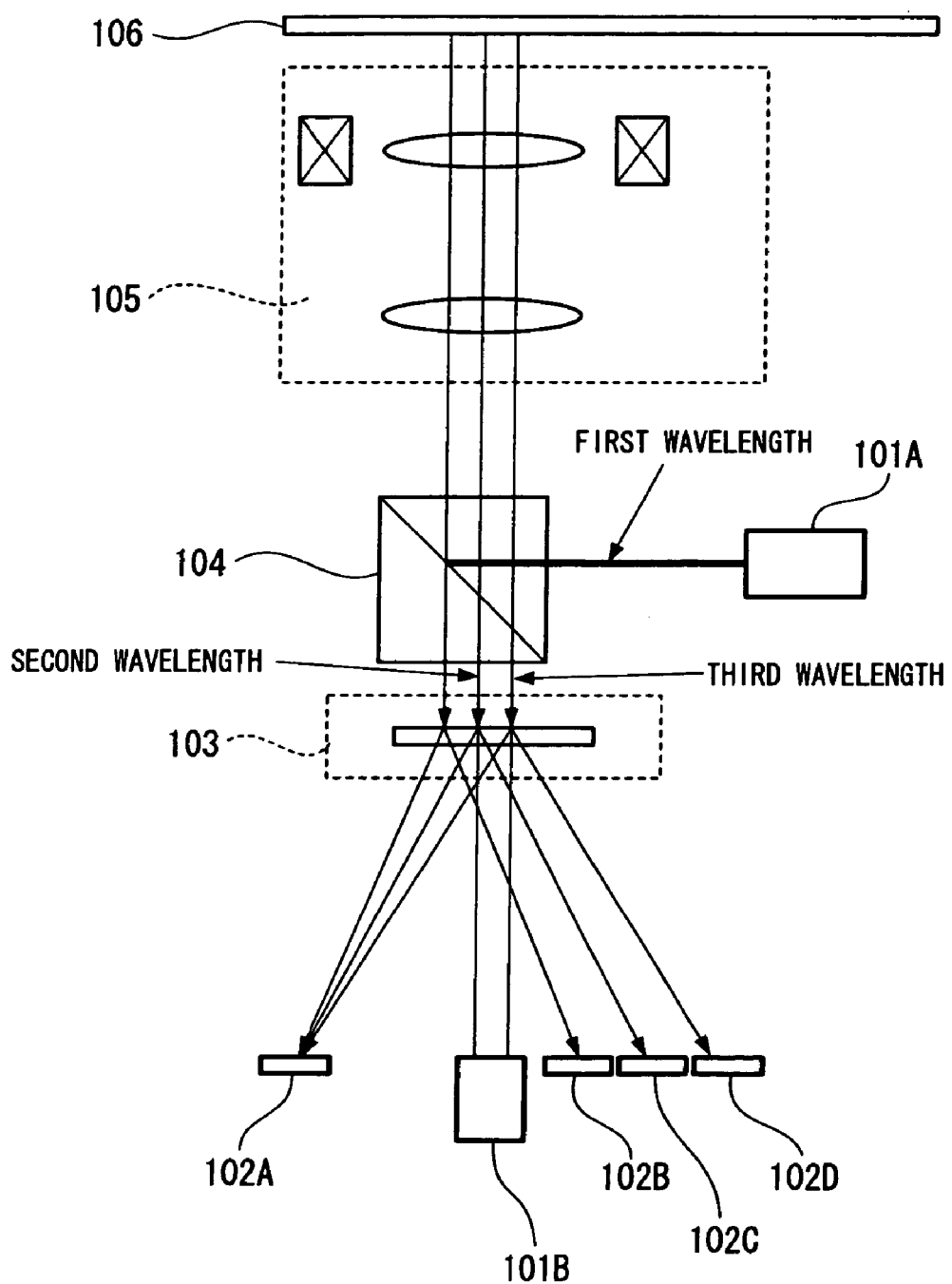
FIG. 5 shows a schematic construction of a conventional optical pickup apparatus.

In this way, the first wavelength light (−2nd order diffracted light) and third wavelength light (−1st order diffracted light) are detected by a single photodetector 102BD and the number of photodetectors 102 is thereby reduced compared to the conventional apparatus explained using FIG. 5. Therefore, it is possible to reduce the overall size of the optical pickup apparatus compared to the conventional one.

The aforementioned polarization beam splitter or the like can be used as the optical path coupling member 104, but it would be more convenient if it also has a function of reflecting or transmitting the first wavelength (405 nm) light depending on its polarization direction because it is possible to thereby improve the efficiency of light utilization.

The aforementioned conventional apparatus also detects both plus and minus diffracted light rays having the respective wavelengths. This is intended to generate signals to apply focus servo so that both light spot sizes on both photodetectors become constant against vertical fluctuations of the optical information recording medium 106. For this purpose, the diffraction grating of the diffraction element 103 is given a curvature so that the focus position of one diffracted light ray is below the single photodetector (here, photodetector 102A) and the focus position of the other diffracted light is above the plurality of photodetectors (here, photodetectors 102C, 102BD). The photodetectors 102 preferably include an anti-reflection coating corresponding to light rays having wavelengths of 405 nm, 650 nm and 780 nm, for example, formed on their surfaces.

Figure 2:
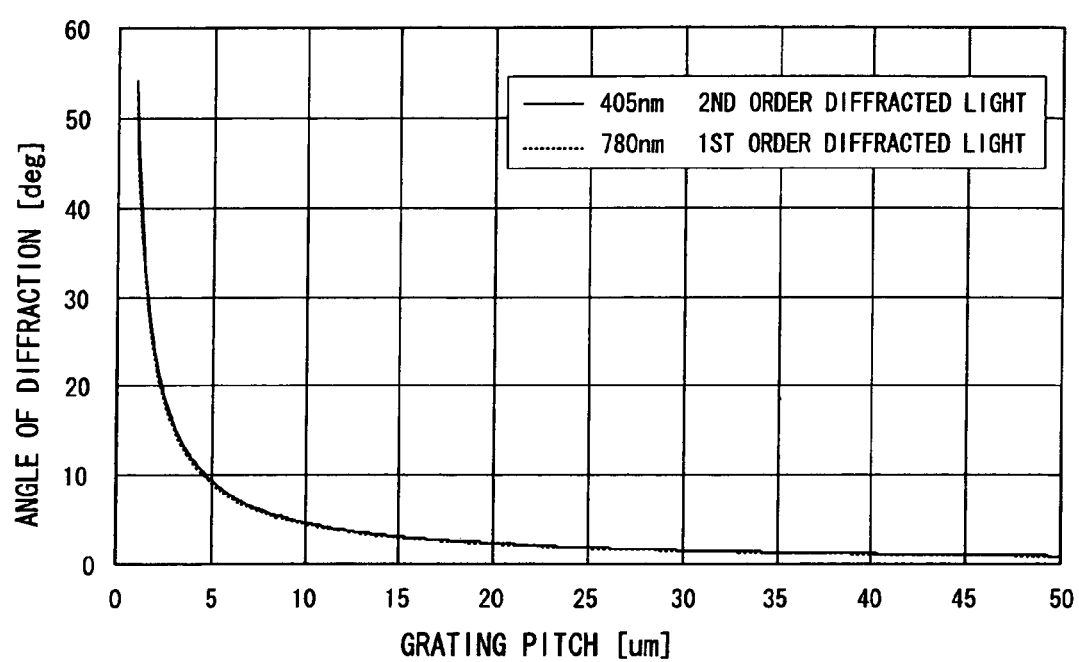
FIG. 2 shows a correlation between a grating pitch and angle of diffraction of diffracted light used for the optical pickup apparatus in FIG. 1.

FIG. 2 shows a relationship between a grating pitch and angle of diffraction for 2nd order diffracted light of the first wavelength light (wavelength 405 nm) and 1st order diffracted light of the third wavelength light (wavelength 780 nm) respectively. In the same figure, the 2nd order diffracted light of the first wavelength light and 1st order diffracted light of the third wavelength light have substantially the same angle of diffraction for their respective grating pitch values. Taking advantage of this characteristic, the −2nd order diffracted light of the first wavelength light and the −1st order diffracted light of the third wavelength light are detected by the single photodetector 102BD as described above. It is normally sufficient if [2nd order angle of diffraction of first wavelength light]−[1st order angle of diffraction of third wavelength light] is within 2 degrees.

Figure 3A:
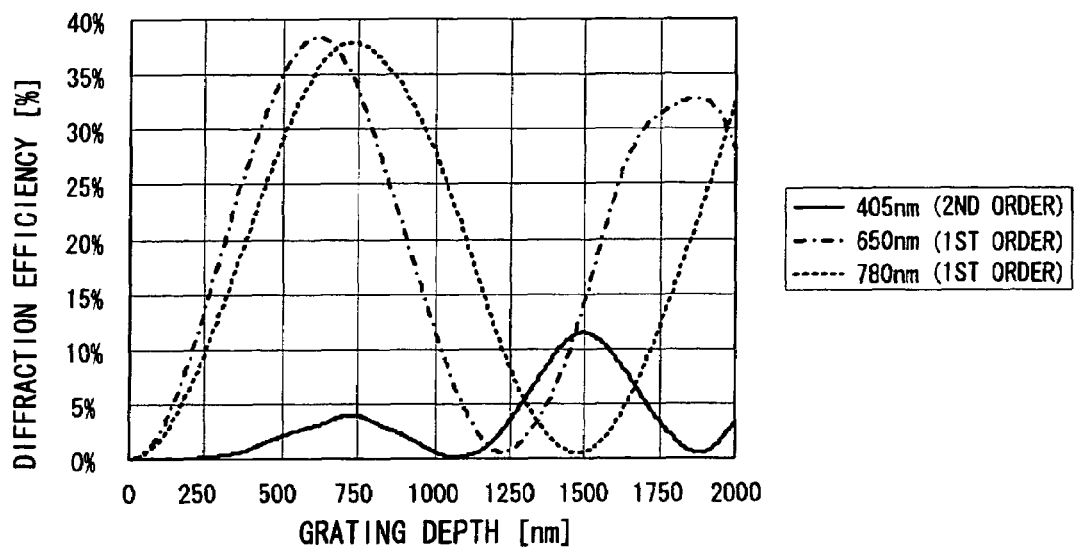
FIG. 3A and FIG. 3B show a correlation between a grating depth and diffraction efficiency of a diffraction element that can be used for the optical pickup apparatus in FIG. 1.
Figure 3A:
Figure 3B:
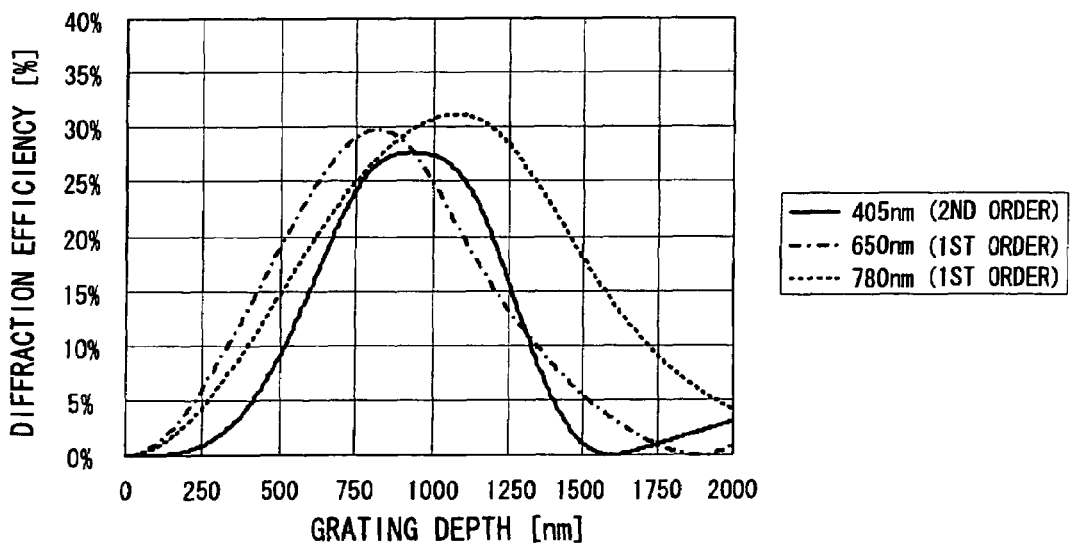
Figure 3B:

FIG. 3A and FIG. 3B show a relationship between a grating depth and diffraction efficiency of two types of grating shapes used for the diffraction element. Suppose the diffraction element has a refractive index of 1.52 and grating constant of 2.5 μm.

As shown in FIG. 3A, when the cross-sectional shape of the diffraction grating is like a square wave, a peak of the 2nd order diffraction efficiency of the first wavelength light (wavelength 405 nm) and peaks of the 1st order diffraction efficiency of the second wavelength light (wavelength 650 nm) and third wavelength light (wavelength 780 nm) appear at separate positions of grating depth.

On the contrary, as shown in FIG. 3B, when the diffraction grating has a sawtooth cross section, a peak of the 2nd order diffraction efficiency of the first wavelength light (wavelength 405 nm) and peaks of the 1st order diffraction efficiency of the second wavelength light (wavelength 650 nm) and third wavelength light (wavelength 780 nm) appear at substantially the same position of grating depth.

Therefore, the sawtooth diffraction element as shown in FIG. 3B is more preferable for the optical pickup apparatus according to the present invention using diffracted light from the diffraction element.

The optical pickup apparatus shown in FIG. 1 has the diffraction element 103 placed between the light source 101B and optical path coupling member 104, but similar effects can be obtained even when it is placed between the optical path coupling member 104 and light condensing member 105 or inside the light condensing member 105 or between the light condensing member 105 and optical information recording medium 106.

Figure 4A:
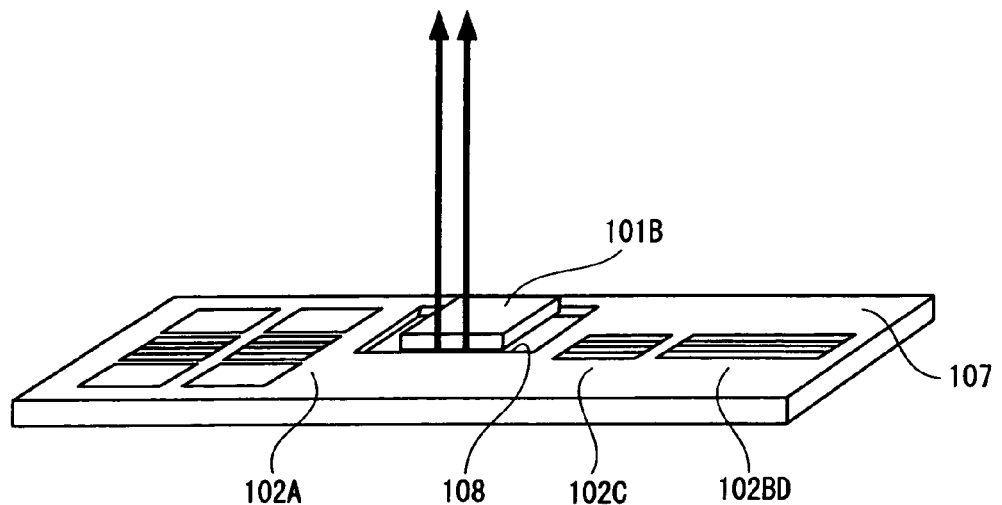
FIG. 4A is a perspective view of an integrated unit used for the optical pickup apparatus in FIG. 1, in which light sources and photodetectors are integrated.
Figure 4B:
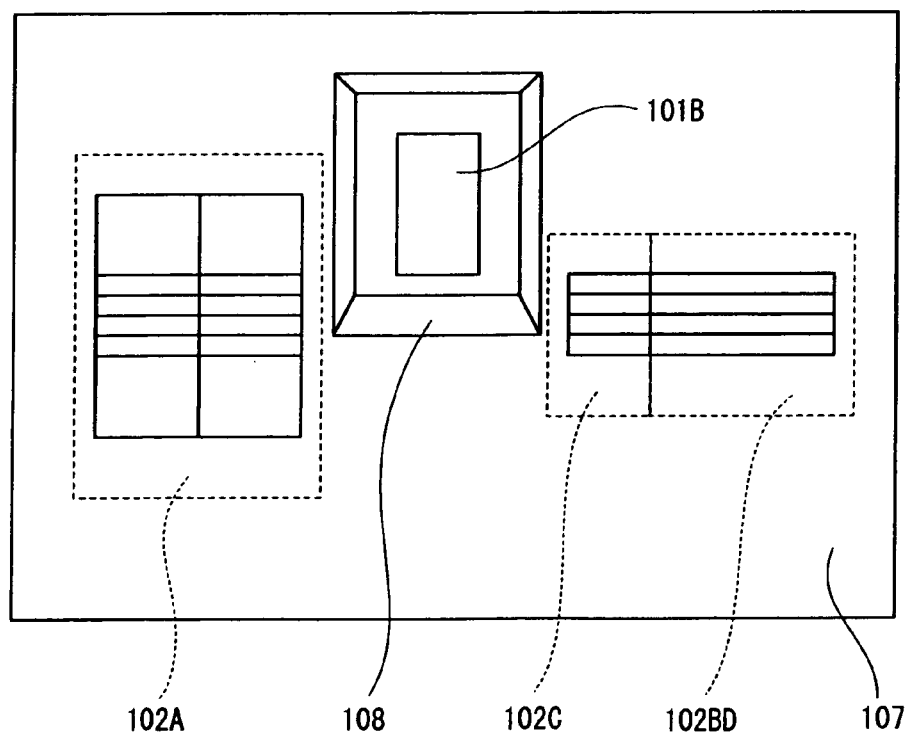
FIG. 4B is a plan view of the same integrated unit.

Furthermore, the light source 101B and photodetectors 102 are arranged separately, but similar effects can be obtained even when an integrated unit in which the light source 101B and photodetectors 102 are integrated is used. In the integrated unit shown in FIG. 4A and FIG. 4B, the light source 101B is also mounted on a substrate 107 (which corresponds to the above described light-receiving element) on which the photodetectors 102 (102A, 102C, 102BD) are formed. Light emitted from the light source 101B is reflected by a micro mirror 108 and oriented upward in vertical direction.

As described above, in the optical pickup apparatus according to the present invention, the optical path coupling member aligns the optical axis directed to the light condensing member of the first wavelength light having the shortest wavelength with that of the third wavelength light having the longest wavelength and irradiates light onto the optical information recording medium. The diffraction element then condenses the +2nd order diffracted light of the first wavelength light and the +1st order diffracted light of the second wavelength light and third wavelength light onto the first photodetector, condenses the −2nd order diffracted light of the first wavelength light and the −1st order diffracted light of the third wavelength light onto the second photodetector and condenses the −1st order diffracted light of the remaining second wavelength light onto the photodetector 102C using the ±2nd order diffracted light of the first wavelength light and ±1st order diffracted light of the second wavelength light and third wavelength light as signal light from the optical information recording medium. The invention increases the number of shared photodetectors when three wavelengths are used and decreases the total number of photodetectors, which allows the overall size of the apparatus to be reduced. This is useful as a small compatible apparatus which records, reproduces or erases information to/from a BD (or HD-DVD), DVD or CD.

What is claimed is:

1. An optical pickup apparatus comprising:
    light sources for emitting light rays having first, second and third wavelengths;
    an optical path coupling member for bringing light rays having said first to third wavelengths to be in a traveling direction in common;
    a light condensing member for condensing light from said optical path coupling member onto an optical information recording medium;
    a diffraction element for diffracting reflected light from said optical information recording medium; and
    a plurality of photodetectors for receiving diffracted light rays from said diffraction element, wherein
    said optical path coupling member aligns an optical axis directed to the light condensing member of the first wavelength light having a shortest wavelength with that of the third wavelength light having a longest wavelength, and
    said diffraction element condenses +2nd order diffracted light of the first wavelength light and +1st order diffracted light of the second wavelength light and third wavelength light into a first photodetector, and condenses the −2nd order diffracted light of the first wavelength light and −1st order diffracted light of the third wavelength light into a second photodetector, using ±2nd order diffracted light of the first wavelength light and ±1st order diffracted light of the second wavelength light and third wavelength light as signal light from said optical information recording medium.

2. The optical pickup apparatus according to claim 1, wherein the light sources for emitting the light rays having the second wavelength and third wavelength and the photodetectors are integrated.

3. The optical pickup apparatus according to claim 1, wherein the diffraction element has a sawtooth or square wave shaped cross section.

4. The optical pickup apparatus according to claim 1, wherein the first wavelength is 405 nm, second wavelength is 650 nm and third wavelength is 780 nm.

* * * * *